(12) United States Patent
Träff (10) Patent No.: US 9,875,530 B2
(45) Date of Patent: Jan. 23, 2018

(54) GRADIENT PRIVACY MASKS

(71) Applicant: AXIS AB, Lund (SE)

(72) Inventor: Gustav Träff, Lund (SE)

(73) Assignee: AXIS AB, Lund (SE)

(*) Notice: Subject to any disclaimer, the term of this patent is extended or adjusted under 35 U.S.C. 154(b) by 246 days.

(21) Appl. No.: 14/548,547

(22) Filed: Nov. 20, 2014

(65) Prior Publication Data

US 2015/0145992 A1 May 28, 2015

(30) Foreign Application Priority Data

Nov. 22, 2013 (EP) .................................... 13194047

(51) Int. Cl.
| G06T 5/00 | (2006.01) |
| G06T 11/60 | (2006.01) |
| H04N 7/18 | (2006.01) |

(52) U.S. Cl.
CPC .............. *G06T 5/003* (2013.01); *G06T 11/60* (2013.01); *H04N 7/183* (2013.01)

(58) Field of Classification Search
CPC  G06T 5/003; G06T 11/60; G06T 5/00; H04N 7/183; H04N 7/18
USPC ...................................................... 348/143
See application file for complete search history.

(56) References Cited

U.S. PATENT DOCUMENTS

| 2005/0168476 A1* | 8/2005 | Levene ................. G06T 15/503 345/582 |
| 2006/0064384 A1 | 3/2006 | Mehrotra et al. |
| 2008/0211903 A1* | 9/2008 | Davey ................ G06K 9/00771 348/39 |
| 2009/0207269 A1 | 8/2009 | Yoda |
| 2009/0262987 A1* | 10/2009 | Ioffe .................. G06K 9/00281 382/118 |
| 2011/0150327 A1* | 6/2011 | Yoo .......................... G06T 1/00 382/165 |
| 2012/0075463 A1* | 3/2012 | Chen ....................... G01S 11/12 348/135 |

FOREIGN PATENT DOCUMENTS

| JP | 2006178825 A | 7/2006 |
| JP | 2012174186 A | 9/2012 |

OTHER PUBLICATIONS

Anonymous: "Facial recognition system", Wikipedia, 16 pages, XP055095448, Nov. 20, 2013. Retrieved from the Internet: URL:http://en.wikipedia.org/w/index.php?title=Facial_recognition_system&oldid=582547646 [Retrieved Jan. 9, 2014].

(Continued)

*Primary Examiner* — Thai Tran
*Assistant Examiner* — Nien-Ru Yang
(74) *Attorney, Agent, or Firm* — Volpe and Koenig, P.C.

(57) ABSTRACT

An apparatus and a method implemented in a computer system for obscuring a first region of an image composed by a plurality of pixels. The method comprising obtaining a mask, the mask defining an obscurity level for each pixel in the first region of the image, and obscuring pixels in the first region of the image based on the mask's obscurity level for each pixel.

19 Claims, 4 Drawing Sheets

(56) References Cited

OTHER PUBLICATIONS

Arnell, F et al. "Generic Fusion of Visual Cues Applied to Real-World Object Segmentation"; 2005 IEEE/RSJ International Conference on Intelligent Robots and Systems; Edmonton, AB, Canada; Aug. 2-6, 2005, IEEE, Piscataway, NJ, USA; pp. 2954-2959; XP010857521; Aug. 2, 2005.
Adobe Photoshop Version 5.0 User Guide—Chapter 7: Selecting (pp. 137-164), XP-002292656, 1998 Adobe Systems Incorporated, 30 pages total.

* cited by examiner

GRADIENT PRIVACY MASKS

CROSS REFERENCE TO RELATED APPLICATION

This application claims the benefit of European Patent Application No 13194047.0 filed on Nov. 22, 2013, which is incorporated by reference as if fully set forth.

FIELD OF INVENTION

The invention relates to digital video monitoring systems, and more specifically, to partial masking of views in a scene that is monitored by a digital video monitoring system.

BACKGROUND

Cameras are used in many different applications, both indoors and outdoors, to monitor a variety of environments. In certain situations there may be a need to treat one part of a captured image different from another part, for example, for privacy reasons. In such instances, a privacy mask may be defined by an operator during set-up of the surveillance equipment. The privacy mask can be used to distort or completely block out certain portions of the image. This is useful, for example, in situations when a surveillance camera is needed, but some parts should be kept hidden from the surveillance system operator, for example, to protect the privacy of the monitored people.

Typically, privacy masks are created during setup of the system by an operator, by manually marking the area(s) of the image that are to be masked using a graphical user interface. The marked areas are typically in the shape of a polygon or a circle and can usually be easily distinguished from the rest of the image captured by the camera. In some cases, the area inside the polygon or circle is "pixelized" or "blurred," while in other cases, the polygon or circle has a uniform color (e.g. black) to mask the area of the image. In either case, the mask is very uniform and this can have a significant impact on the image, drawing attention to the mask itself rather than to the information that is actually of interest in the image.

SUMMARY

Described herein is an apparatus and method that provides gradient privacy masks for captured images. The method, in a computer system, obscures a first region of an image composed by a plurality of pixels. The method includes obtaining a mask, where the mask defines an obscurity level for each pixel in the first region of the image, and where two individual pixels of the mask have different obscurity levels. The pixels in the first region of the image are then obscured based on the mask's obscurity level for each pixel.

The apparatus and method provide a way of masking portions of the image in a way that does not have significant impact on the image and that avoids drawing attention to the mask itself rather than to the information that is actually of interest in the image. Furthermore, since individual pixels of the mask have different obscurity levels, it allows some parts of the mask to cover something that needs to be more distorted than another part of the mask.

In one embodiment, the content of the image is analyzed, and the mask is created by applying one or more rules to the results of the analysis, the rules defining obscurity levels with respect to image content. This enables a user to configure rules defining to what degree various objects or regions of the image should be obscured.

In one embodiment, obscuring pixels includes blurring pixels to a degree that is based on the mask's obscurity level for each pixel. Blurring, by using, for example, Gaussian blur or box blurring, can in many cases provide a better way of obscuring pixels compared to simply changing the 'transparency' of a pixel, which may sometimes still allow details in the image to become identifiable.

In one embodiment, pixels that represent objects in the image that are located close to the camera capturing the image have a higher obscurity level than pixels that represent objects in the image that are located further away from the camera capturing the image. This makes it possible to blur an region to a higher degree where objects are close and therefore need more distortion, while less blurring can be applied to regions of the image that show objects that are further away and therefore need less blurring.

In one embodiment, the mask covers the entire image and the obscurity levels are in the range from 0% to 100%. This makes it possible to control the obscurity of every single pixel in the image and achieve a very fine-grained mask that can be defined such that the desired features to be masked can be masked at a very high level of detail.

In one embodiment, the first region represents an object that is identified using an object-tracking algorithm applied to successive captured images. This allows conventional object detection and object tracking algorithms to be used to detect or identify, for example, a human or an animal, a face, a license plate, text or visual information. Once the object has been identified, an adaptive privacy mask can be applied to these objects automatically as described above, without requiring any user input, based on one or more predefined rules. The identified objects can then automatically be followed and masked automatically throughout several successive captured images.

In one embodiment, the first region represents an object that is identified by determining a temperature differential between the object and the object's surroundings. This enables a user to set up rules specifying, for example, that a mask should be applied when there is a certain temperature differential between an object and its surroundings. The degree of obscurity can vary based on the temperature differential. For example, an individual's extremities and clothes are often colder than 37 degrees Celsius, and will thus be less blurred than the face of the person, which is acceptable since the face is generally the feature of the individual that needs to be protected more due to privacy reasons.

In one embodiment, the first region represents a background of the image and a second region of the image is emphasized as a result of obscuring the background of the image. By masking the "background" rather than "objects" in the image, especially if combined with various types of object and/or motion detection techniques, these masks could be used to "highlight," for example, people or animals that "hang out" in a scene depicted by a camera, as opposed to those who just pass through. Similarly, the mask can be used to "highlight" people who have a higher body temperature in a crowd compared to the rest of the people in the crowd.

In one embodiment, the content of the image is analyzed and the mask is created by applying one or more rules to the results of the analysis, the rules defining a gradual transition around the edges of the first region of the image to create a smooth transition between the masked and unmasked regions of the image. This creates a much smoother transition between masked and unmasked regions of the image, which further avoids drawing attention to the mask itself rather than to the information that is actually of interest in the image.

In one embodiment, the mask is a privacy mask. That is, the masking techniques described herein are useful, for example, in situations when a surveillance camera is needed, but some parts should be kept hidden from the surveillance system operator, for example, to protect the privacy of the monitored people.

According to another aspect, the invention relates to a computer-readable recording medium having recorded thereon a program for implementing the above method when executed on a device having processing capabilities The computer-readable recording medium involves advantages corresponding to those of the method and may be varied similarly.

The details of one or more embodiments of the invention are set forth in the accompanying drawings and the description below. Other features and advantages of the invention will be apparent from the description and drawings, and from the claims.

It is noted that the invention relates to all possible combinations of features recited in the claims.

The steps of any method disclosed herein do not have to be performed in the exact order disclosed, unless explicitly stated.

BRIEF DESCRIPTION OF THE DRAWINGS

The above disclosed and other aspects of the present invention will now be described in more detail, with reference to the appended drawings showing embodiments of the invention.

Like reference symbols in the various drawings indicate like elements.

DETAILED DESCRIPTION OF THE PREFERRED EMBODIMENTS

The present invention will now be described more fully with reference to the accompanying drawings, in which currently preferred embodiments of the invention are shown. The invention may however be embodied in many different forms and should not be construed as limited to the embodiments set forth herein.

Current privacy masks are typically very uniform, irrespective of which type of masking, (polygons, pixelization, blurring, and the like) is used. This makes it very obvious to a person viewing the image that a certain portion of the image has been masked. That is, there is a clearly visible transition between the masked and unmasked portions of the image. The various embodiments described herein address this problem by providing a novel type of privacy mask that creates a smoother transition between masked and unmasked portions of an image, thus resulting in a more "normal" looking image to a person who is viewing the picture, where the sharp transitions between masked and unmasked regions are not present.

The various embodiments also provide a privacy mask that only partially hides what is under the privacy mask by varying the degree of masking on a pixel-by-pixel basis. As will be described in further detail below, in some embodiments, this is achieved by using different blur levels or by using different "obscurity levels" for different regions of the privacy mask. For example, individual pixels of the privacy mask can have different levels of masking, allowing some parts of the privacy mask to cover something that needs to be more distorted than another part of the privacy mask. For instance, it may be desirable to blur an region to a higher degree where some objects are close and therefore need more distortion, while less blurring can be applied to regions of the image that show objects that are further away and therefore need less blurring. As will also be described below, the intensity of different parts of the mask can be dynamically set based on parameters relating to the content of the image. In one embodiment, the mask covers the entire image and varies from 0% masking to 100% masking.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Hence, the present invention is related to methods and apparatus, including computer program products, implementing and using techniques for obscuring a first region of an image composed by several pixels. A mask is obtained. The mask defines an obscurity level for each pixel in the first region of the image. Pixels in the first region of the image are obscured based on the mask's obscurity level for each pixel.

Figure 1:
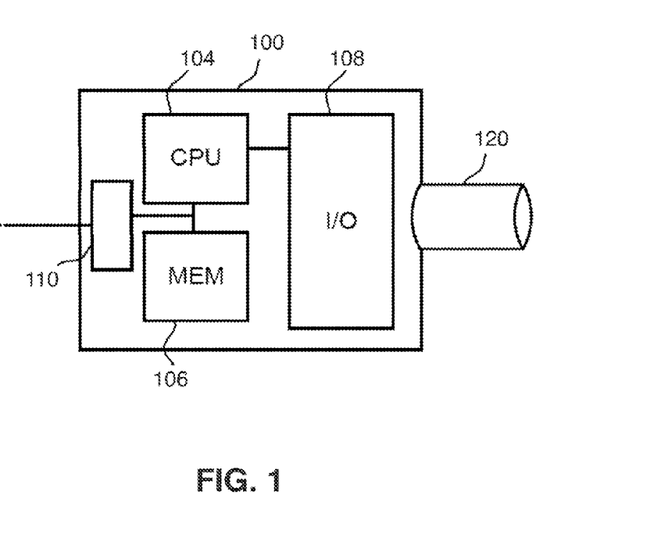
FIG. 1 shows a schematic view of a video camera that is used to capture or survey a scene, in accordance with one embodiment.

Described herein is the capturing of images. FIG. 1 shows a schematic view of a video camera 100 that is used to capture or survey a scene. The goal is for the camera 100 to capture images of the scene as well as possible. The camera 100 includes a lens system 120 for collecting incident light, an image sensor, for example in the form of a charge coupled device (CCD), a complementary metal-oxide-semiconductor (CMOS)-sensor or similar sensor, for registering incident light, as well as circuitry as is known in the art. For example, the circuitry typically includes an image processing module 108 that comprises an image/video encoder (implemented in hardware, software, or any combination thereof), a processing unit 104 that manages, for example video analytics, a memory 106, and a network interface 110 for connection to a network and further processing equipment, such as a computer. The image processing module 108 including the image/video encoder is arranged to encode captured digital image data into any one of several known formats for continuous video sequences, for limited video sequences, for still images or for streamed images/video. For instance, the image information may be encoded into MPEG1, MPEG2, MPEG4, H.264, JPEG, M-JPEG, bitmapped, etc.

Figure 2A:
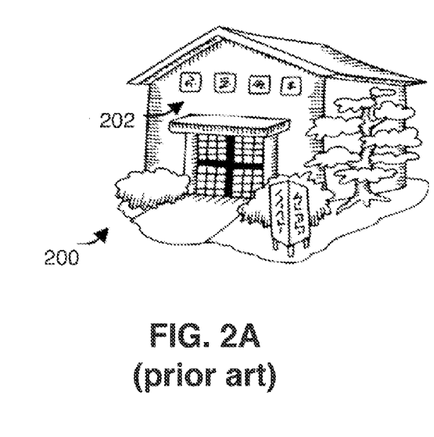
FIG. 2A shows a schematic example of an image captured by the camera of FIG. 1, in accordance with one embodiment.
Figure 2B:
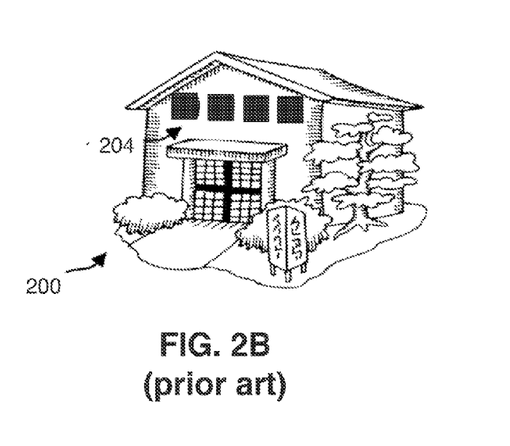
FIG. 2B shows a schematic example of a conventional privacy mask that has been applied to the image of FIG. 2A.

Described herein are adaptive privacy masks. FIG. 2A shows a schematic example of an image 200 captured by the camera 100. The image 200 shows a house that has a set of windows 202. Traditionally, there may be regions in the image that should not be viewed, due to privacy reasons, and the like. As was described above, in such situations, it is common to create a privacy mask to block such regions. FIG. 2B shows a schematic example of a conventional privacy mask 204 in the shape of four opaque squares that has been applied to the each window 202 of the house 200. As can be seen in FIG. 2, it is very clear to a viewer of the image 200 that a privacy mask 204 has been used to block out certain portions of the image 200.

Figure 3:
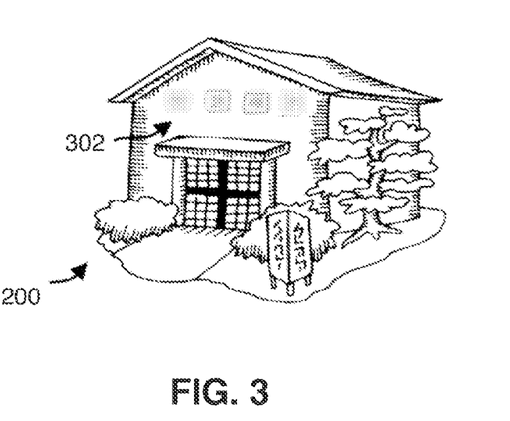
FIG. 3 shows a schematic example of a privacy mask in accordance with one embodiment that has been applied to the image of FIG. 2A.

FIG. 3 shows a schematic example of an image 200, in which a privacy mask 302 in accordance with one embodiment has been applied. As can be seen in FIG. 3, in contrast to the privacy mask 204 of FIG. 2, the privacy mask 302 has a varying degree of obscurity. For example, in this case, the two windows in the center are not blocked as much as the windows on the right edge and the left edge, respectively. That is, the privacy mask 302 has a varying degree of obscurity that can be set for the image on a pixel-by-pixel basis. As will be described in further detail below, the level of obscurity is typically set dynamically based on the content of the image 200.

In addition, as can be seen in FIG. 3 the transition between the edges of the privacy mask 302 and the background can be set to be smoother compared to conventional privacy masks. As a result, the image 200 that uses the privacy mask 302 in accordance with the various embodiments of the invention has a more "natural" appearance compared to the image 200 in FIG. 2, which uses the prior art privacy mask 204.

Figure 4A:
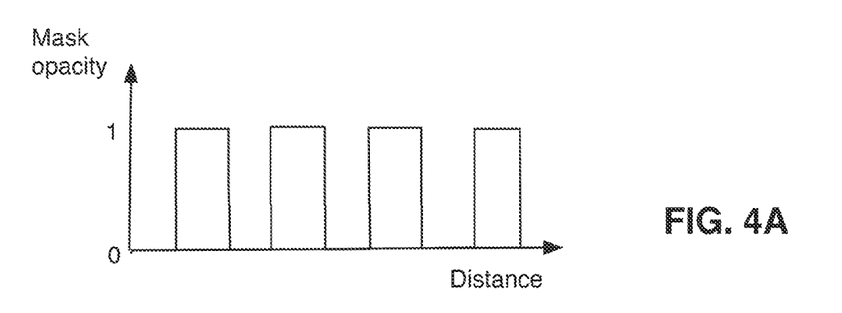
FIG. 4A is a schematic diagram showing the "mask opacity" of the privacy mask in FIG. 2B as a function along a horizontal line of pixels through the four windows in the image of FIG. 2A.
Figure 4B:
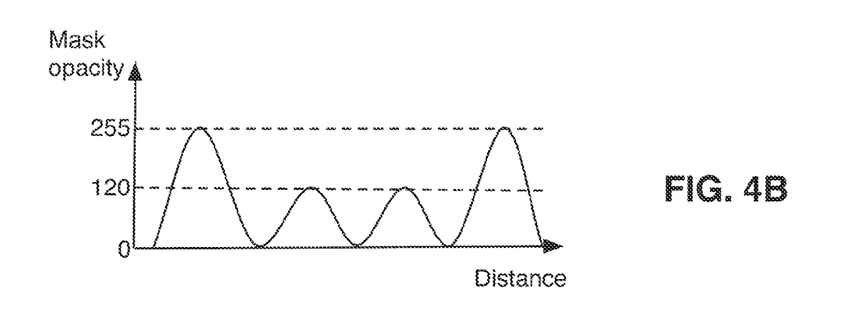
FIG. 4B is a schematic diagram showing the "mask opacity" of the privacy mask in FIG. 3 as a function along a horizontal line of pixels through the four windows in the image of FIG. 2A, in accordance with one embodiment.

To further describe how the privacy mask 302 of FIG. 3 can be implemented in one embodiment, please refer to FIGS. 4A and 4B, which show the "mask opacity" as a function along a horizontal line of pixels through the four windows in the image 200. FIG. 4A illustrates what the "mask opacity" looks like when the conventional privacy mask 204 of FIG. 2B. A "mask opacity value" of "1" in FIG. 4A signifies "completely masked" (i.e., black in FIG. 2B) while a mask opacity value of "0" means "unmasked" (i.e., transparent in FIG. 2B). As can be seen in FIG. 4A, there are four regions that are masked (i.e., have the mask opacity value 1). Surrounding these regions, there are unmasked regions (i.e., have the mask opacity value 0). As can further be seen in FIG. 4A, the transitions between the masked and unmasked regions are abrupt (i.e., vertical lines), thus creating very clear distinctions between the masked and unmasked regions.

The diagram in FIG. 4B shows what the "mask opacity" looks like when the privacy mask 302 in accordance with one embodiment is used. In this embodiment, the mask opacity values range from 0 to 255, instead of from 0 to 1. However, it should be realized that these values just represent one embodiment and that other mask opacity value ranges could be used to achieve a higher or a lower resolution, respectively, based on the specific situation in which the mask will be used. A "mask opacity value" of "255" in FIG. 4B means "completely masked" (i.e., black in FIG. 3) while a mask opacity value of "0" means "unmasked" (i.e., transparent in FIG. 3). The privacy mask 302 can have any value between these numbers.

As can be seen in FIG. 4B, there are four regions that are masked (represented by the "peaks" in the diagram). Surrounding these regions, there are unmasked regions (represented by the "valleys" in the diagram). The transitions between the masked and unmasked regions are not abrupt (i.e., there are no vertical lines, but rather sloping ones), but instead there is a gradual transition between the peaks and the valleys, thus creating a smoother transition and blurring the distinctions between the masked and unmasked regions in FIG. 3, compared to conventional techniques. As can also be seen in the diagram of FIG. 4B, the two peaks in the middle (representing the two middle windows in the image) have a lower mask opacity peak value. That is, instead of having a peak value of 255, they only have a peak value of 120, which means that these regions of the mask are more transparent than the portions on the edges, as is visible in FIG. 3.

There are many ways in which the "opacity value" can be set on a pixel-by-pixel basis. For example, many graphic systems use the RGBA (Red Green Blue Alpha) color model for pixels, in which the alpha channel is used as an opacity channel. Typically, if a pixel has a value of 0% in its alpha channel, the pixel is fully transparent (and thus invisible), whereas as value of 100% in the alpha channel gives a fully opaque pixel. Thus, by selecting appropriate alpha channel values for individual pixels in the privacy mask, the mask can be composited with the captured image and a variable privacy mask can be obtained. However, there may be situations in which changing the transparency might not be the best method of obscuring details in an image, as semitransparent objects do not always necessarily become less identifiable. Therefore other alternatives, such as blurring, which will be explained in further detail below, can sometimes be a better option.

Thus, while the description above has been focused on masks having a variable "mask opacity," the same concepts can be applied to other ways of manipulating an image for privacy reasons. For example, in some embodiments, blurring can be used instead, which may be varied on a pixel-by-pixel basis throughout the image. Blurring, for example, by convolving the image with a Gaussian function, is well known to those of ordinary skill in the art. Essentially, a Gaussian blur (also referred to as Gaussian smoothing) produces a smooth blur resembling that of viewing the image through a translucent screen. Mathematically, applying a Gaussian blur to an image is the same as convolving the image with a Gaussian function, which has the effect of reducing the image's high-frequency components. A Gaussian blur is thus a low-pass filter. When a Gaussian blur is performed on an image, each pixel's new value is set to a weighted average of that pixel's neighborhood. The original pixel's value receives the heaviest weight (having the highest Gaussian value) and neighboring pixels receive smaller weights as their distance to the original pixel increases. This results in a blur that preserves boundaries and edges better than other, more uniform blurring filters. Typically, when performing a Gaussian blur on an image, the blurring process is divided up into two separate passes. In the first pass, a one-dimensional kernel is used to blur the image only in the horizontal or vertical direction. In the second pass, another one-dimensional kernel is used to blur in the remaining direction. The resulting effect is the same as convolving with a two-dimensional kernel in a single pass, but requires fewer calculations.

An alternative way of blurring, and which is often used to approximate a Gaussian blur, is referred to as box blurring. A box blur is an image filter in which each pixel in the resulting image has a value equal to the average value of its neighboring pixels in the input image. Thus, it is a slightly different form of a low-pass filter. If a box blur is applied three times on the same image, the box blur approximates the Gaussian kernel to within about 3%, thus yielding essentially the same result as a quadratic Gaussian convolution kernel.

Another well-known technique that can be used to create a privacy mask is pixelization, that is, deliberately displaying certain portions of the image at a significantly lower resolution than the original image. Privacy masks can be created in accordance with various embodiments that use any of these techniques alone or in various combinations.

Described herein is smoothing of mask edges. In some embodiments, the smoothing of the privacy mask edges can be performed in a similar fashion to how blurring is performed, that is, by convolving the composite image and privacy mask with a Gaussian function or a blur box. For example, a polygon describing the region occupied by an object that should be masked could typically be expanded a little in all directions to allow a transition from no obscurity to the obscurity level defined by the mask. As the skilled person realizes, in the case of having a mask covering the entire image, there is obviously no need to expand the mask to smooth its edges.

Described herein is dynamic rule-based privacy masking. Typically, the masking of an image is performed dynamically by applying rules to the images received from the camera 100. The camera typically captures images at a rate of about 5-60 frames per second, and rules can be defined that, based on the content of the images and/or other inputs, causes the various types of privacy masks described above to be applied to the images.

For example, in one embodiment, any type of conventional object detection algorithm can be used to detect or identify, for example, a human or an animal, a face, a license plate, text or visual information. Once the object has been identified, an adaptive privacy mask can be applied to these objects automatically as described above, without requiring any user input, based on one or more predefined rules.

In another embodiment, the camera 100 may include a thermal image sensor instead of (or in addition to) a visual image sensor. A thermal image sensor in this context should be understood as an image sensor which is sensitive to radiation in the far-infrared spectrum, such as a microbolometer, and which produces a thermal image, or thermogram, showing heat radiated by different objects. A user can set up rules specifying, for example, that a privacy mask should be applied when there is a certain temperature differential between an object and its surroundings. For example, a human face typically has a temperature of 37 degrees Celsius while often the surroundings in an indoor environment are approximately 20 degrees Celsius. Thus, a rule can be constructed that specifies that a privacy mask should be applied when the temperature differential is greater than, say 12 degrees Celsius, to blur out a person's face. In some embodiments, the degree of blurring can vary based on the temperature differential. For example, an individual's extremities and clothes are often colder than 37 degrees Celsius, and will thus be less blurred than the face of the person, which is acceptable since the face is generally the feature of the individual that needs to be protected more due to privacy reasons. In addition, a smooth transition could be applied around the edges of the privacy mask, as described above, thereby creating a privacy mask that does not draw too much of a user's attention away from what is important in the image.

In yet another embodiment, the visual image recorded by the camera 100 can be combined with information obtained from a distance sensor, and rules can be stipulated that, for example, cause regions of the image that are closer to the camera to be blurred out more or have a higher masking opacity, compared to regions of the image that are further away from the camera.

As the skilled person realizes, these are merely some examples of inputs and rules that can be used when determining what the privacy mask will look like, and many variations and combinations are readily available to those of ordinary skills in the art. Irrespective of what type of input is used the end result is that an adaptive privacy mask is provided, which can vary in intensity and/or blurring and/or pixelization, on a pixel-by-pixel basis, and that a smooth transition between masked and unmasked regions can be obtained.

Figure 5:
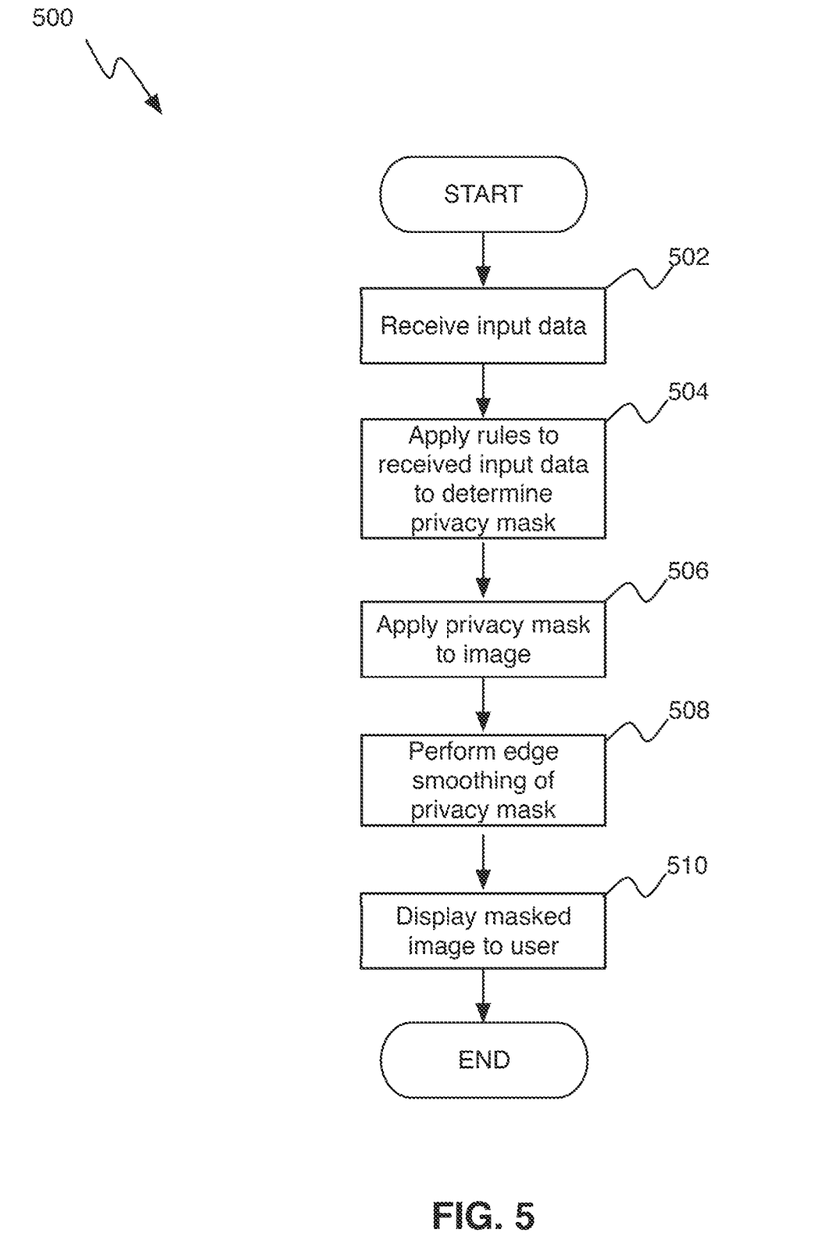
FIG. 5 is a flowchart showing a process for applying a privacy mask to a captured image, in accordance with one embodiment.

FIG. 5 shows a process 500 for adaptive image privacy masking in accordance with one embodiment. As can be seen in FIG. 5, the process 500 starts by receiving input data in step 502. The input data typically includes the image 200 captured by the camera 100, and/or other input data, such as a thermal image, or information from a distance sensor, etc., as discussed above. Next, one or more rules are applied to the received input data in step 504, in order to determine an adaptive privacy mask for the received image 100. Some examples of rules have been discussed above with respect to distances and temperature differentials, but as the skilled person realizes, virtually any type of rules can be applied that allow a privacy mask to be created, in which the opacity/blurring/pixelization, etc. varies on a pixel-by-pixel basis.

Once the privacy mask has been created, it is applied to the image in step 506. The image with the privacy mask applied is then smoothed around the edges of the privacy mask in step 508, as discussed above, to create a gradual transition between the masked and unmasked portions of the image 100. Finally, the privacy-masked image is displayed to a user in step 510, which ends the process 500.

In the above process, applying the rules to determine a privacy mask and performing edge smoothing of the privacy mask have been described as two separate steps (steps 504 and 508). However, it should be noted that this is merely one exemplary embodiment. In other embodiments, these steps can be performed as a single step where the rules to determine the privacy mask also includes adding gradient transitions to the edges of the privacy mask.

It should also be noted that while the privacy masks that have been described in the examples herein have used varying degrees of opacity, pixelization, and/or blurring, of course this is not a necessity. The privacy masks may, just like in the prior art privacy masks, have a uniform degree of opacity, pixelization, and/or blurring, but in combination with a smooth transition between the masked and unmasked portions of the image, as described above.

In some embodiments, the various obscurity levels of the privacy mask can be achieved by varying the video compression of each pixel, based on the obscurity level set by the mask. For example, a higher video compression can be used for pixels where a higher obscurity level is desired, and a lower video compression can be used for pixels where a lower obscurity level is desired. This can create a "blurring effect" with a very high compression in the places where the obscurity level of the mask is the highest.

It should further be noted that while the privacy masks have been described herein in the context of obscuring information that is present in certain regions of an image, the same techniques can be used to enhance portions of an image, for example, by masking the "background" rather than "objects" in the image. Such applications may be useful in a wide variety of circumstances. For example, if combined with various types of object and/or motion detection techniques, these privacy masks could be used to "highlight," for example, people or animals that "hang out" in a scene depicted by a camera, as opposed to those who just pass through, to possibly identify suspicious behaviors. Similarly, the privacy mask can be used to "highlight" people who have a higher body temperature (perhaps due to some kind of illness) in a crowd compared to the rest of the people in the crowd. Thus, many variations are possible, which can be envisioned by those of ordinary skill in the art.

Figure 6:
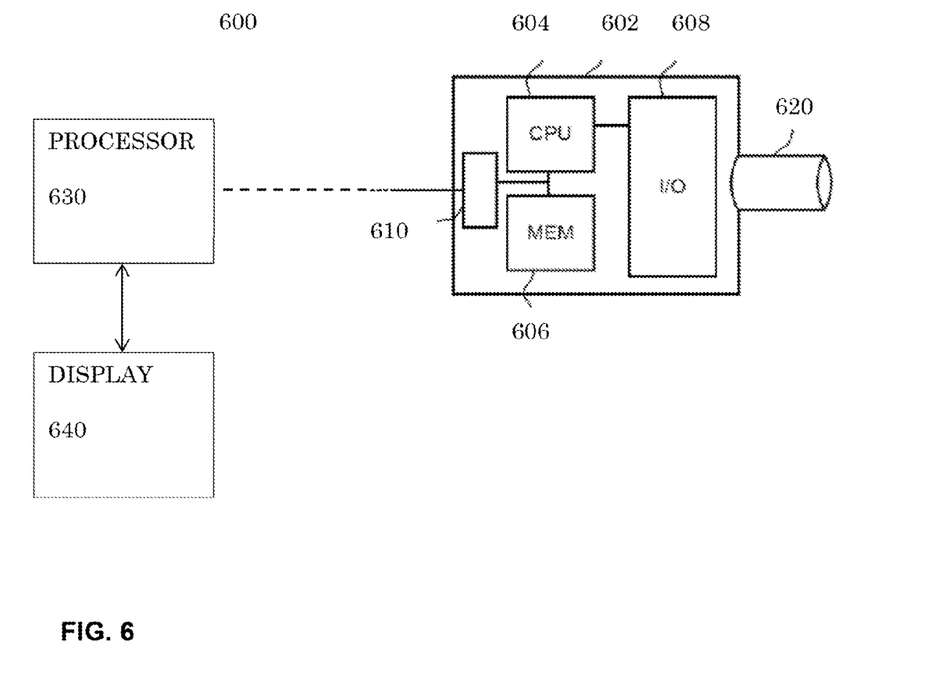
FIG. 6 is an example system for applying a privacy mask to a captured image, in accordance with one embodiment.

FIG. 6 is an example system 600 for applying a privacy mask to a captured image, in accordance with one embodiment. The system 600 includes a camera 602 in communications with a processor 630, which in turn is in communications with a display 640. Although depicted as individual components for purposes of illustration, the processor 630 and display 640 may be one component. The camera 602 includes a lens system 620 for collecting incident light, an image sensor, for example in the form of a charge coupled device (CCD), a complementary metal-oxide-semiconductor (CMOS)-sensor or similar sensor, for registering incident light, as well as circuitry as is known in the art. For example, the circuitry typically includes an image processing module 608 that comprises an image/video encoder (implemented in hardware, software, or any combination thereof), a processing unit 604 that manages, for example video analytics, a memory 606, and a network interface 610 for connection to a network and further processing equipment, such as the processor 630. The image processing module 608 including the image/video encoder is arranged to encode captured digital image data into any one of several known formats for continuous video sequences, for limited video sequences, for still images or for streamed images/video. For instance, the image information may be encoded into MPEG1, MPEG2, MPEG4, H.264, JPEG, M-JPEG, bitmapped, and the like.

Operatively, the camera 602 captures images of a scene. The images and/or other input data, such as a thermal image, or information from a distance sensor, etc., as discussed above, are input to the processor 630. The processor 630 applies one or more rules to the received input data in order to determine an adaptive privacy mask for the received image. Some examples of rules have been discussed above with respect to distances and temperature differentials, but as the skilled person realizes, virtually any type of rules can be applied that allow a privacy mask to be created, in which the opacity/blurring/pixelization, etc. varies on a pixel-by-pixel basis. Once the privacy mask has been created, the processor 630 applies the privacy mask to the image. The image with the privacy mask applied is then smoothed around the edges of the privacy mask by the processor 630, as discussed above, to create a gradual transition between the masked and unmasked portions of the image. The display 640 displays the privacy-masked image to a user.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method implemented in a computer system for producing a masked image having an obscured first region, the method comprising:

capturing, by a camera, an image composed by a plurality of pixels;

analyzing the content of the image;

automatically creating, by the computer system absent user input, a privacy mask by applying one or more rules to the results of the analysis, the rules defining a gradual transition around the edges of a first region of the image to create a smooth transition between masked and unmasked regions of the image and thereby obtaining the privacy mask defining an obscurity level for each pixel in the first region of the image on a pixel-by-pixel basis, the rules further defining said obscurity level for each pixel with respect to image content, wherein the obscurity levels indicate different degrees by which corresponding portions of the image are visually hidden; and automatically applying, by the computer system absent user input, the privacy mask to the image, thereby producing the masked image having obscured pixels in the first region of the masked image based on the privacy mask's obscurity level for each pixel.

2. The method of claim 1, wherein obscuring pixels includes blurring pixels to a degree that is based on the mask's obscurity level for each pixel.

3. The method of claim 1, wherein pixels that represent objects in the image that are located close to the camera capturing the image have a higher obscurity level than pixels that represent objects in the image that are located further away from the camera capturing the image.

4. The method of claim 1, wherein the mask covers the entire image and wherein the obscurity levels are in the range from 0% to 100%.

5. The method of claim 1, wherein the first region represents an object that is identified using an object-tracking algorithm applied to successive captured images.

6. The method of claim 1, wherein the first region represents an object that is identified by determining a temperature differential between the object and the object∂s surroundings.

7. The method of claim 1, wherein the first region represents a background of the image and a second region of the image is emphasized as a result of obscuring the background of the image.

8. A non-transitory computer-readable recording medium having recorded thereon a program for implementing the method according to claim 1 when executed on a computer.

9. A system for producing a masked image having an obscured first region, the system comprising:

a processor configured to receive at least an image composed by a plurality of pixels from a camera;

the processor configured to analyze the content of the image;

the processor configured to automatically, absent user input, create a privacy mask by applying one or more rules to the results of the analysis, the rules defining a gradual transition around the edges of a first region of the image to create a smooth transition between masked and unmasked regions of the image and obtaining the privacy mask defining an obscurity level for each pixel in the first region of the image on a pixel-by-pixel basis, the rules defining obscurity level for each pixel with respect to image content, wherein the obscurity levels indicate different degrees by which corresponding portions of the image are visually hidden; and the processor configured to automatically, absent user input, apply the privacy mask to the image, producing the masked image having obscured pixels in the first region of the masked image based on the privacy mask's obscurity level for each pixel.

10. The system of claim 9, wherein obscuring pixels includes blurring pixels to a degree that is based on the mask's obscurity level for each pixel.

11. The system of claim 9, wherein pixels that represent objects in the image that are located close to the camera capturing the image have a higher obscurity level than pixels that represent objects in the image that are located further away from the camera capturing the image.

12. The system of claim 9, wherein the mask covers the entire image and wherein the obscurity levels are in the range from 0% to 100%.

13. The system of claim 9, wherein the first region represents an object that is identified using an object-tracking algorithm applied to successive captured images.

14. The system of claim 9, wherein the first region represents an object that is identified by determining a temperature differential between the object and the object's surroundings.

15. The system of claim 9, wherein the first region represents a background of the image and a second region of the image is emphasized as a result of obscuring the background of the image.

16. A method implemented in a computer system for producing a masked image having an obscured first region, the method comprising:

capturing, by a camera comprising a visual image sensor and a thermal image sensor, an image composed by a plurality of pixels, analyzing the content of the image, determining a temperature differential between an object in the first region and the object's surroundings, automatically creating, by the computer system absent user input, a privacy mask by applying rules to the results of the analysis, one rule specifying that the privacy mask is to be applied when there is a certain temperature differential between the object and its surroundings, and another rule specifying that an obscurity level of the privacy mask varies based on the temperature differential, wherein the obscurity levels indicate different degrees by which corresponding portions of the image are visually hidden, and another rule defining a gradual transition around the edges of the first region of the image to create a smooth transition between masked and unmasked regions of the image and thereby obtaining the privacy mask defining an obscurity level for each pixel in the first region of the image on a pixel-by-pixel basis; and automatically applying, by the computer system absent user input, the privacy mask to the image, thereby producing the masked image having obscured pixels in the first region based on the privacy mask's varying obscurity level.

17. The method of claim 16, further comprising when creating the privacy mask applying a rule of defining obscurity levels with respect to image content.

18. The method of claim 16, wherein the object is a person.

19. The method of claim 18, wherein the rule specifying that the obscurity level of the object varies based on the temperature differential is set such that the person's extremities and clothes are less obscured than the face of the person.

* * * * *